United States Patent [19]
Walker et al.

[11] Patent Number: 5,100,944
[45] Date of Patent: Mar. 31, 1992

[54] USE OF ETHYLENE GLYCOL DIACETATE IN WATERBORNE ADHESIVES

[75] Inventors: John W. Walker, Yardley, Pa.;
Joseph Wieczorek, Pittstown, N.J.;
David W. Lydzinski, Telford, Pa.;
Malie Tsurunaga, Oakland, Calif.

[73] Assignee: National Starch and Chemical Investment Holding Corporation, Wilmington, Del.

[21] Appl. No.: 566,959

[22] Filed: Aug. 14, 1990

[51] Int. Cl.$^5$ .............. C08K 5/10; C08L 29/04; C08F 20/40; C08F 218/08
[52] U.S. Cl. .............. 524/306; 524/315; 524/503; 526/328; 526/330; 526/331
[58] Field of Search ........................ 524/306

[56] References Cited

U.S. PATENT DOCUMENTS

| | | | |
|---|---|---|---|
| 3,387,992 | 6/1968 | Arthur et al. | 117/105.3 |
| 3,852,009 | 12/1974 | Roberts et al. | 425/83 |
| 3,896,073 | 7/1975 | Smith | 524/460 |
| 3,906,135 | 9/1975 | Krutzel | 428/246 |
| 4,361,625 | 11/1982 | Beckmann et al. | 428/412 |
| 4,446,274 | 5/1984 | Okazaki et al. | 524/812 |
| 4,474,915 | 10/1984 | Grinacoff | 524/111 |
| 4,752,348 | 6/1988 | Bryant et al. | 156/201 |
| 4,900,777 | 2/1990 | Ball et al. | 524/819 |

FOREIGN PATENT DOCUMENTS

| | | |
|---|---|---|
| 57-000186 | 1/1982 | Japan . |
| 61-013488 | 4/1986 | Japan . |
| 63-034197 | 7/1988 | Japan . |
| 01197464 | 8/1989 | Japan . |
| 1211481 | 11/1970 | United Kingdom . |

OTHER PUBLICATIONS

From "Handbook of Adhesives" by Skeist; Polyvinyl Acetate Emulsions for Adhesives pp. 393-399.
Ageflex EGDA, Technical Information Bulletin, CPS Chemical Company, Old Bridge, N.J.
Esters, Technical Bulletin, Union Carbide.
Ethylene Glycol Diacetate, Publication No. M-157C, Technical Data, Eastman Coatings Chemicals, Oct. 1978.
Ethylene glycol diacetate, Technigram C115/1, BP Chemicals, London, England.

*Primary Examiner*—Joseph L. Schofer
*Assistant Examiner*—Wu C. Cheng
*Attorney, Agent, or Firm*—Ellen T. Dec; Jane E. Gennaro

[57] ABSTRACT

The use of ethylene glycol diacetate in place of methyl chloroform (1,1,1-trichloroethane) in conventional waterborne packaging and converting adhesives provides comparable adhesive products with reduced environmental and health related problems.

12 Claims, No Drawings

USE OF ETHYLENE GLYCOL DIACETATE IN WATERBORNE ADHESIVES

The packaging adhesive area has traditionally been dominated by waterborne adhesives based on polyvinyl acetate homo-, co- or terpolymer dispersions. In many of these packaging applications, organic or inorganic solvents are added to enhance the ability of the waterborne adhesive to "wet-out" and/or penetrate the substrate, thereby improving adhesion. Halogenated solvents, and particularly methyl chloroform (1,1,1-trichloroethane), are most commonly used for these purposes, however, their potential environmental and health related effects have resulted in a search for a satisfactory alternative solvent.

We have now found that when ethylene glycol diacetate is used in waterborne dispersion adhesives, properties comparable to those achieved with methyl chloroform result. Thus, the present invention is directed to waterborne packaging and converting adhesives comprising;
A) 100 parts by weight of a mixture of:
  a) 10 to 98 parts by weight of a dispersion of vinyl acetate homo-, co- or terpolymer;
  b) 2 to 30 parts by weight plasticizer; and
  c)
    i) 0 to 10 parts by weight polyvinyl alcohol;
    ii) 0 to 40 parts by weight tackifier;
    iii) 0 to 30 parts by weight filler;
    iv) 0 to 40 parts by weight humectant; and
    v) mixtures of i-iv;
B) to which is added 1 to 20 parts by weight ethylene glycol diacetate as the sole organic solvent.

The use of ethylene glycol diacetate in accordance with the invention may be adapted to any conventional waterborne vinyl acetate based packaging or converting adhesive formulation. Moreover, substantially lower levels of ethylene glycol diacetate are required to achieve the comparable performance of methyl chloroform in the same adhesive system and, indeed, satisfactory results have been achieved using as little as 20% as much ethylene glycol diacetate as would be required were methyl chloroform used as the solvent.

It will be understood that the precise formulation of the various types of adhesives will vary depending upon the specific end use. In general, the adhesives of the invention will substantially be comprised of dispersions of polyvinyl acetate or copolymers or terpolymers of vinyl acetate with up to 80% of other ethylenically unsaturated copolymerizable comonomers such as alpha olefins, $C_1$-$C_9$ esters of mono or dicarboxylic acid, particularly those esters of acrylic, methacrylic and maleic acids. Ethylene, 2-ethyl hexyl acrylate and dibutyl maleate are the most commonly employed comonomers. The vinyl acetate polymer is generally present in the adhesive in the form of an aqueous dispersion at a solids level of about 50 to 65% by weight, preferably at about 55% solids. The vinyl acetate dispersion may optionally contain polyvinyl alcohol as a protective colloid or alternatively polyvinyl alcohol may be added to the waterborne adhesive formulation. The aqueous dispersion of the vinyl acetate polymer is generally present at levels of 50 to 90 parts by weight per 100 parts of the unsolvented formulation, preferably 60 to 80 parts. The polyvinyl alcohol, if present, is used at levels of 0.1 to 10 parts, preferably 0.5 to 5.0 parts which, as discussed above, may be present in the vinyl acetate dispersion or may be separately added.

Any plasticizer conventionally used in vinyl acetate-based waterborne packaging adhesives may be used herein. Representative plasticizers include acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether, tributoxyethyl phthalate, triethylene glycol polyester of benzoic acid and phthalic acid, or mixtures thereof. Of these plasticizers, dibenzoate types, phthalates, liquid polyesters or sulfonated types are preferred. The plasticizer is generally used in amounts of 2 to 30 parts, preferably 3 to 15 parts, per 100 parts of the unsolvented formulation.

Other additives, traditionally used in packaging adhesives may also be utilized herein in conventional amounts. Such additives include defoamers, preservatives, thickeners, humectants, fillers, tackifiers and the like. Representative tackifiers are generally used in dispersion form at 40–65% solids in amounts up to about 40 parts by weight, preferably 2 to 10 parts, and include coumarone-indene, ester gum, gum rosin, hydrocarbon resins, hydrogenated rosin, phenolic modified hydrocarbon resins, rosin esters, tall oil rosins, terpene phenolic, terpene resins, toluenesufonamideformaldehyde resin, and wood rosin. Suitable thickeners include oliginates, bentonite, casein, fumed silica, guar gum, gum tragacanth, hydroxyethylcellulose, locust bean gum, methylcellulose, polyacrylic acid salts (ammonium, potassium sodium), polyvinyl alcohol, sodium carboxymethyl cellulose, and starches. Useful fillers include bentonite, calcium carbonate, calcium silicate, clay, mica, nut shell flours, silica, talc, uncooked starches, and wood flour. If present, the fillers are used at levels of up to about 30 parts by weight. Humectants for use herein in amounts up to about 40 parts by weight include calcium chloride, diethylene glycol, glycerine, hexylene glycol, propylene glycol, magnesium chloride, sodium nitrate, sorbitol, sucrose and urea. Additional water is often added to obtain the desired application viscosity.

In order to increase the penetrating effects of the adhesive, it is also preferred to formulate the adhesives of the invention with 0.05 to 5.0 parts per 100 parts (unsolvented formulation) of a surfactant. The surfactants can be anionic, cationic, amphoteric or nonionic surface-active compounds or mixtures thereof. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chain and branch-chain alkanols with 6 to 22 carbon atoms, or alkylphenols, or higher fatty acids, or higher fatty acid amines, or primary and secondary higher alkyl amines; as well as block copolymers of propylene oxide with ethylene oxide and mixtures thereof. Preferred surfactant include fluorinated alkyl amphoterics or sodium dioctylsulfosuccinate.

As noted above, the ethylene glycol diacetate is added in amounts of 1.0 to 20 parts, preferably 5 to 10 parts, per 100 parts of the formulated unsolvented adhesive. In addition to providing a non-hazardous replacement for methyl chloroform, the ethylene glycol diacetate has the added advantage of being odorless, a desirable property in the packaging industry. While reference is made herein to ethylene glycol diacetate, it is recognized that substantially similar results will be obtained with the use of other glycol diacetates and the latter are included within the scope of the invention.

The resultant adhesives, when appropriately formulated, may be used in virtually any packaging and converting applications wherein waterborne adhesives are commonly employed including, but not limited to, case and carton forming and sealing, tube winding, bag manufacture, glued lap, paper and flexible film laminating and the like.

In the following examples, all parts are by weight and all temperatures in degrees Celcius unless otherwise noted.

EXAMPLE I

The following example illustrates the preparation of a non-hazardous waterborne adhesive suitable for glued lap applications.

A mixture of 6.0 parts water and 0.5 parts polyvinyl alcohol was stirred until dispersed. The mixture was then heated with stirring to 185°–195° F. for 1 hour or until smooth, and then cooled to below 140° F. Subsequently, 40.0 parts Duroset C-325 (a polyvinyl acetate dispersion prepared by a continuous polymerization process and available from National Starch and Chemical Company) and 30.0 parts Resyn 1025 (a polyvinyl acetate dispersion prepared by a batch polymerization process and available from National Starch and Chemical Company) were added to the mixture. 10.0 parts ethylene vinyl acetate copolymer dispersion was then added and the entire mixture stirred for 30 minutes after which 8.0 parts of a mixture of diethylene and dipropylene dibenzoate, 5.0 parts ethylene glycol diacetate, 0.2 parts defoamer, 0.1 part surfactant, 0.1 part preservative were added sequentially. The entire mixture was stirred for 1 hour and diluted to the desired viscosity (1500 centipoise) with water.

EXAMPLE II

Using the basic procedure described in Example I, other adhesives were formulated as shown in Table I. Also prepared were control formulations using methyl chloroform.

TABLE I

| Raw Material | 1 | 2 | 3 | 4 | Control |
|---|---|---|---|---|---|
| Water | 5.82 | 5.80 | — | 5.36 | 5.46 |
| Polyvinyl alcohol | 0.48 | 0.48 | — | 0.44 | 0.46 |
| Duroset C-325 | 38.83 | 48.63 | 45.00 | — | 45.54 |
| Resyn 1025 | 29.13 | 29.18 | — | — | 27.32 |
| Dibenzoate mixture | 7.77 | 7.78 | 7.00 | 7.15 | 7.28 |
| Ethylene glycol diacetate | 4.85 | 4.86 | 2.50 | 4.46 | — |
| Defoamer | 0.19 | 0.19 | 0.40 | 0.17 | 0.19 |
| Surfactant | 0.09 | — | — | 0.18 | — |
| Preservative | 0.09 | 0.09 | 0.10 | 0.09 | 0.09 |
| Ethylene Vinyl Acetate | 9.71 | — | 45.00 | 80.35 | — |
| Methyl chloroform | — | — | — | — | 9.10 |
| Water Adjustment | 3.22 | 2.99 | — | 1.80 | 4.56 |

The resultant adhesives, I–IV and the control, were tested using the following procedures. (It should be noted that these testing procedures are only used in comparing one adhesive to another on the same substrate. Results can vary from day to day depending on ambient conditions in the room).

Set Speed: This test, often referred to as "drying speed", is designed to determine the time it takes for an adhesive bond to become stronger than the substrates it is bonding. Procedure: A wet adhesive film or "drawdown" is made onto a substrate using a Bird, wire rod or another applicator of specified film thickness (typically 0.5–2.0 wet mils). A second substrate, which has uniform strips cut into it, is placed immediately on top of first coated substrate. Pressure is quickly applied across the newly formed bond using a hand-held roller and a timer is started. The precut strips from the second substrate are peeled back at various time intervals until a bond is observed with a majority of substrate failure (typically, greater than 50% fiber tear). The timer is stopped immediately and time is noted. This process is repeated to compare various adhesives and/or substrates.

Open Time: This test is designed to determine the time an adhesive is "useful" or can still be used to form a bond while it is exposed to air. Procedure: A wet adhesive film or "drawdown" is made onto substrate using a Bird, wire rod or another applicator of specified film thickness (typically 0.5–2.0 wet mils) and a timer is immediately started. Precut strips of a second substrate are placed onto the adhesive drawdown at various time intervals. Light, even pressure should be applied by hand to each strip. This procedure is repeated until the film is dry and a bond can no longer form. The newly formed series of bonded strips are allowed to dry for 1 hour at which point, the strips are peeled off. The time at which a bond with little or no fiber tear is observed is designated the open time for that adhesive. The process is repeated to compare various adhesives and/or substrates.

Penetration Test: This test is designed to compare an adhesive's ability to penetrate into various substrates. It can be used to study the effects of additives into an adhesive and how penetration is altered. Procedure: One or two drops of a dilute adhesive (usually below 10 cps) are placed on a substrate surface and the time is noted when the drop is completely absorbed into the substrate.

Bonding Test: This test is used to determine the adhesion characteristics of adhesives on various substrates. Procedure: Two pieces of the substrate(s) to be tested are bonded together by applying a consistent amount of adhesive across one substrate using a Bird, wire rod or another applicator to simulate end use application methods and placing the other substrate on top. Pressure is applied using a hand roller unless otherwise specified. Bonds are allowed to dry at least 24 hours, at which time bonds are checked for degree of fiber tear.

The results of the testing are shown in Table II.

TABLE II

| Test | 1 | 2 | 3 | 4 | Control |
|---|---|---|---|---|---|
| Set Speed (sec) | 44–46 | 48–50 | 46–48 | 34–36 | 36–38 |
| Open time | 360 | * | 340 | * | 300 |
| Penetration (min) | 16 | * | 16 | * | 15 |
| Bonding (% Fiber Tear) | | | | | |
| Substrate: | | | | | |
| Michelman 763 | 100 | 100 | 100 | 100 | 100 |
| Michelman 40E on white Kraft | 100 | 100 | 100 | 100 | 100 |
| Michelman 40E | 100 | 100 | 100 | 100 | 100 |

TABLE II-continued

| Test | 1 | 2 | 3 | 4 | Control |
|---|---|---|---|---|---|
| on plain Kraft | | | | | |
| Michem Coat 40E | 100 | 100 | 100 | 100 | 100 |
| Michem Coat 40H | 100 | 100 | 100 | 100 | 100 |
| Nomar 70 | 100 | 100 | 100 | 100 | 100 |
| Fuller WB-2511-R on white Kraft | 100 | 100 | 100 | 100 | 100 |
| Fuller WB 2511-R on plain Kraft | <20 | <10 | <10 | <10 | <10 |
| Clay coated board | <10 | <10 | <10 | 100 | <10 |
| Michelman 40-H on large board | 100 | 100 | 100 | 100 | 100 |

*Not tested.

EXAMPLE III

Another waterborne adhesive was formulated for use in tubewinding applications by combining 92.8 parts Resyn 1025 (polyvinyl acetate homopolymer), 0.2 parts defoamer, 4.0 parts of a mixture of diethylene and dipropylene glycol dibenzoate, 3.0 parts ethylene glycol diacetate and 5.5 parts water. When tested on commercial tubewinding equipment, this adhesive performed comparably to a similar adhesive formulated with methyl chloroform.

We claim:

1. A waterborne packaging and converting adhesive consisting essentially of:
   A) 100 parts by weight of a mixture of:
      a) 10 to 98 parts by weight of a dispersion of vinyl acetate homo-, co- or terpolymer;
      b) 2 to 30 parts by weight plasticizer and
      c)
         i) 0 to 10 parts by weight polyvinyl alcohol;
         ii) 0 to 40 parts by weight tackifier;
         iii) 0 to 30 parts by weight filler;
         iv) 0 to 40 parts by weight humectant; and
         v) mixtures of i-iv;
   B) to which is added 1 to 20 parts by weight ethylene glycol diacetate as the sole organic solvent.

2. The adhesive of claim 1 wherein the vinyl acetate is present as a homopolymer.

3. The adhesive of claim 1 wherein the vinyl acetate is present as a copolymer containing up to 80% of other ethylenically unsaturated copolymerizable comonomers selected from the group consisting of alpha olefins, $C_1$-$C_9$ esters of mono- or dicarboxylic acid.

4. The adhesive of claim 3 wherein the vinyl acetate is presented as a copolymer with ethylene.

5. The adhesive of claim 1 wherein polyvinyl alcohol is present and is used in an amount of 0.5 to 5.0 parts by weight.

6. The adhesive of claim 1 wherein the plasticizer is selected from the group consisting of acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether and tributoxyethyl phthalate or mixtures thereof.

7. The adhesive of claim 6 wherein the plasticizer is a mixture of diethylene and dipropylene glycol dibenzoate.

8. The adhesive of claim 1 wherein the plasticizer is present in amounts of 3 to 15 parts per 100 parts of the unsolvented formulation.

9. The adhesive of claim 1 wherein there is additionally present 2 to 10 parts of a tackifier selected from the group consisting of coumarone-indene, ester gum, gum rosin, hydrocarbon resins, hydrogenated rosin, phenolic modified hydrocarbon resins, rosin esters, tall oil rosins, terpene phenolic, terpene resins, toluenesufonamide-formaldehyde resin, and wood rosin.

10. The adhesive of claim 1 additionally containing 0.05 to 5.0 parts per 100 of a surfactant.

11. The adhesive of claim 10 wherein the surfactant is a fluorinated alkyl amphoteric or sodium dioctylsulfosuccinate.

12. The adhesive of claim 1 wherein the ethylene glycol diacetate is present at levels of 5 to 10 parts per 100 parts of the formulated unsolvented adhesive.

* * * * *